US008978159B1

(12) United States Patent
van Dijk et al.

(10) Patent No.: US 8,978,159 B1
(45) Date of Patent: Mar. 10, 2015

(54) METHODS AND APPARATUS FOR MEDIATING ACCESS TO DERIVATIVES OF SENSITIVE DATA

(71) Applicants: Marten van Dijk, Somerville, MA (US); Samuel J. Curry, North Andover, MA (US); Robert D. Hopley, Fitchburg, MA (US); John G. Linn, Carlisle, MA (US); Alina M. Oprea, Arlington, MA (US); Kenneth Ray, Seattle, WA (US)

(72) Inventors: Marten van Dijk, Somerville, MA (US); Samuel J. Curry, North Andover, MA (US); Robert D. Hopley, Fitchburg, MA (US); John G. Linn, Carlisle, MA (US); Alina M. Oprea, Arlington, MA (US); Kenneth Ray, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 67 days.

(21) Appl. No.: 13/731,514

(22) Filed: Dec. 31, 2012

(51) Int. Cl.
*G06F 21/62* (2013.01)
(52) U.S. Cl.
CPC ...................................... *G06F 21/62* (2013.01)
USPC .......................................................... 726/29

(58) Field of Classification Search
USPC ...................................................... 726/28–30
See application file for complete search history.

(56) References Cited

U.S. PATENT DOCUMENTS

| 7,908,644 B2* | 3/2011 | Roskind et al. | 726/3 |
| 2008/0235759 A1* | 9/2008 | McCarty | 726/1 |
| 2009/0006230 A1* | 1/2009 | Lyda et al. | 705/35 |
| 2010/0287382 A1* | 11/2010 | Gyorffy et al. | 713/185 |
| 2014/0058949 A1* | 2/2014 | Ciurea | 705/44 |

* cited by examiner

*Primary Examiner* — Beemnet Dada
(74) *Attorney, Agent, or Firm* — Ryan, Mason & Lewis, LLP

(57) ABSTRACT

Access control systems are provided that mediate access to derivatives of sensitive data. A method is provided for processing a data request from a client, the data request comprising a client identifier and an indication of the intended use of the data, by receiving the data request from the client; providing the client identifier and indicated use to an access manager, wherein the access manager assesses a risk of providing access to the data for the indicated use; if the access manager grants access for the indicated use, receiving one or more keys with corresponding computing restrictions from the access manager; computing a result; and providing the result to the client, wherein the provided result comprises the derivative of sensitive data. The access manager grants the access for the indicated use, for example, based on a risk score.

25 Claims, 5 Drawing Sheets

FIG. 4

DATABASE CREATION PROCESS – 400

```
FOR EACH COLUMN
    FOR EACH ONION LAYER FOR VARIOUS COMPUTATION ON THE DATA
410 ——— PICK AN APPROPRIATE ENCRYPTION ALGORITHM, AND
         GENERATE A UNIQUE KEY
420 ——— IF PARALLEL ONION SCHEMES ARE DESIRED, THEN
         ENSURE THAT THE APPROPRIATE NEW COLUMNS,
         CORRESPONDING TO THE ORIGINAL COLUMN ARE CREATED.
```

FIG. 5

DATA INSERTION PROCESS – 500

```
WHEN DATA IS PLACED INTO A GIVEN ROW
510 —— CLIENT REQUEST 322 REQUESTS ACCESS MANAGER 340/KEY MANAGER 350
         TO GRANT INDIRECT ACCESS TO THE KEYS
520 —— ACCESS MANAGER 340/KEY MANAGER 350 CHECKS ACCESS CONTROLS
         RULES AND PERFORMS AUTHENTICATION AND RISK CHECKS
530 —— ACCESS MANAGER 340/KEY MANAGER 350 RELEASES APPROPRIATE
         KEYS TO SCC 330
540 —— CLIENT 310 PROVIDES DATA FOR THE ROW TO SCC 330

550 —— FOR EACH COLUMN, INSERT THE DATA BY:
         ENCRYPTING WITH EACH LAYER AS CHOSEN ABOVE
         INSERTING THE RESULTING DATA INTO THE GIVEN COLUMN FROM THE DB
560 —— IF PARALLEL ONION SCHEMES ARE DESIRED, NEST-ENCRYPT THE NEW DATA
         AND INSERT IN THE NEW COLUMN AS DESCRIBED IN DB CREATION 400
570 —— SCC 330 WILL DELETE KEY MATERIAL AS INDICATED BY THE KEY-HYGIENE
         POLICY OF THE OVERALL SYSTEM.
```

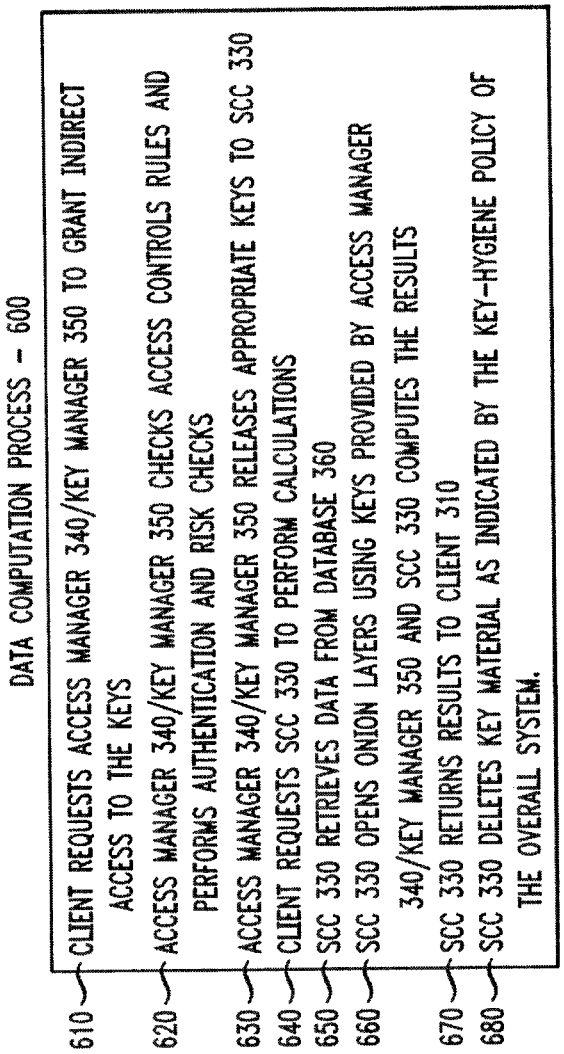

METHODS AND APPARATUS FOR MEDIATING ACCESS TO DERIVATIVES OF SENSITIVE DATA

FIELD OF THE INVENTION

The present invention relates generally to security techniques for authenticating users over a network or in other types of communication systems.

BACKGROUND OF THE INVENTION

In order to gain access to sensitive information or other resources, users are often required to authenticate themselves by entering authentication information. Some users attempt to gain access to such information with credentials obtained fraudulently from a legitimate account holder. Adaptive authentication techniques, for example, identify fraudulent users even though such users possess credentials to gain access to a legitimate user's account information. Adaptive authentication techniques typically compare information associated with a login attempt received by the service provider, such as the time of the login and a location from where the login originated, with a historical record of a typical user who exhibits some expected login behavior.

Adaptive authentication techniques apply a challenge to risky transactions, where the riskiness estimation arrives from a fraud/genuine classifier. The response to the challenge is used to classify the transaction as being genuine or fraudulent. Conventional authentication services typically either grant users full access to sensitive data or no access at all. The context of a user (such as user location, user access privileges defined by a user role and characteristics of the user device) is used to determine which combination of authentication factors (e.g., a device fingerprint and/or a password) is required to gain trust in the user's intention and grant access to the queried sensitive data.

Existing authentication systems typically aim to ensure that data is available only to those entities that are authorized to obtain it. Privacy goals, however, also require that even authorized entities are constrained in terms of how they use the data. A Mediated Privacy (MP) model has been proposed to grant access to sensitive data for specific types of usage, such as allowing filtered queries or selective data transfer. See, e.g., John Linn, "On Technology and Internet Privacy," IAB/W3C/ISOC/CSAIL Internet Privacy Workshop, Cambridge, Mass. (December 2010), or John Linn, "Technology and Web User Data Privacy: A Survey of Risks and Countermeasures," IEEE Security & Privacy 3(1): 52-58 (2005). The Mediated Privacy (MP) model, however, provides access to at least portions of the sensitive data.

A need remains for access control systems that mediate access to derivatives of sensitive data.

SUMMARY OF THE INVENTION

The present invention in the illustrative embodiments described herein provides access control systems that mediate access to derivatives of sensitive data. In accordance with an aspect of the invention, a method is provided for processing a data request from a client, the data request comprising a client identifier and an indication of the intended use of the data. The method comprises the steps of receiving the data request from the client; providing the client identifier and indicated use to an access manager, wherein the access manager assesses a risk of providing access to the data for the indicated use; if the access manager grants access for the indicated use, receiving one or more keys with corresponding computing restrictions from the access manager; computing a result; and providing the result to the client, wherein the provided result comprises the derivative of sensitive data.

The access manager grants the access for the indicated use, for example, based on a risk score. In various embodiments, the risk score is based on one or more of information revealed by the layer; a classification of the one or more encrypted database entries; an amount of information revealed by the result; a tenant identifier of the client; and a presence of the secure computing container. In one embodiment, the risk score comprises an overall risk, wherein the overall risk is a product of a User Risk for a user associated with the data request and a Transaction Risk for a transaction associated with the data request.

The access control techniques of the illustrative embodiments overcome one or more of the problems associated with the conventional techniques described previously, and provide improved security by mediating access to derivatives of sensitive data. These and other features and advantages of the present invention will become more readily apparent from the accompanying drawings and the following detailed description.

BRIEF DESCRIPTION OF THE DRAWINGS

FIG. 4 illustrates pseudo code for an exemplary database creation process;

FIG. 5 illustrates pseudo code for an exemplary data insertion process; and

FIG. 6 illustrates pseudo code for an exemplary data computation process.

DETAILED DESCRIPTION

Figure 1:
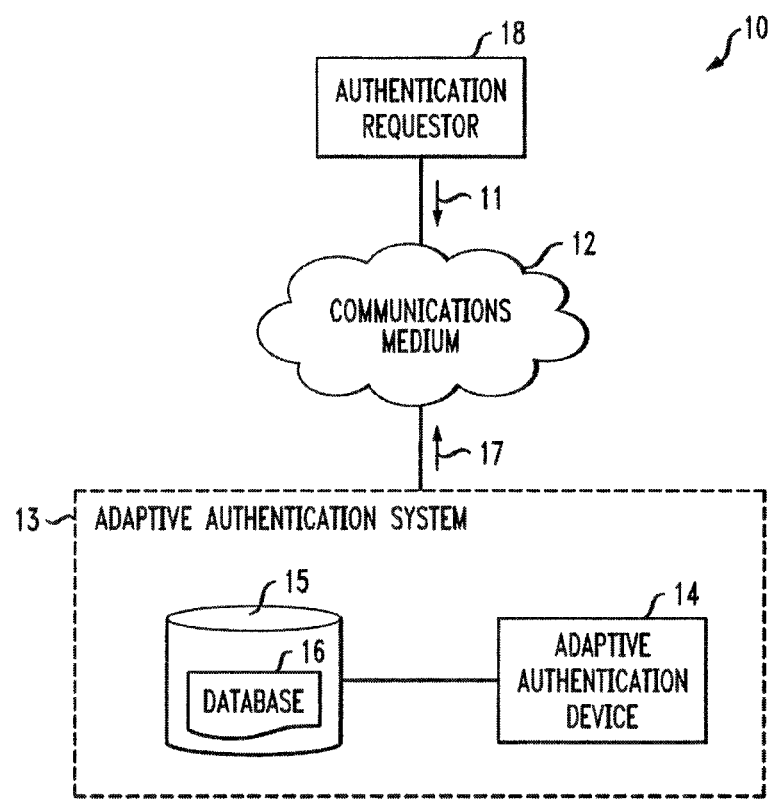
FIG. 1 is a schematic diagram illustrating an electronic environment in which the present invention can be implemented.

The present invention provides access control systems that mediate access to derivatives of sensitive data. While existing authentication systems grant access based on user identity and/or role, aspects of the present invention grant access to data based on the manner in which the data will be used. Multiple discrete steps are used to represent the state of data for various permitted uses (as opposed to the conventional approach where data is either encrypted or plain).

Aspects of the present invention provide improved access control mechanisms by mediating access to derivatives of sensitive data. Thus, exposure of the underlying sensitive data reverts back to its most protected form after the necessary calculations have been completed. Risk based decisions are employed to determine whether to grant access to certain derivatives of data.

Consider the following example: suppose a user wishes to evaluate a function f(D) on some sensitive data D. If the user is allowed (based on his context and measured authentication factors) to compute f(D), then in the Mediated Privacy model, the user device (or another third party that computes on behalf of the user) gets access to D, computes f(D) and discards D. According to one aspect of the present invention, the authentication service interacts with a secure compute container (SCC) that computes and transmits f(D) to the user. The attack surface is thereby reduced, since no part of D ever appears in the clear at the user's (possibly compromised) device. Only the derivative, f(D), appears in the clear to the user. For a more detailed discussion on the use of secure compute containers for private computation on data, see e.g., S. W. Smith and D. Safford, "Practical Server Privacy With Secure Coprocessors," IBM Systems Journal, Vol. 40, No. 3 (2001), incorporated by reference herein.

Consider another example, where a user encrypts database entries using different encryption layers. The encryption layers form an "onion" that can be peeled one layer at a time to obtain more and more functionality. See, e.g., Raluca Ada Popa et al., "CryptDB: Protecting Confidentiality with Encrypted Query Processing," SOSP'11 (2011), incorporated by reference herein. Generally, CryptDB encrypts each column of a given database, multiple times, with different types of encryption, called layers. Each layer allows more ability to compute on the data, at the expense of revealing more about the protected data (revealing more about the privacy). The idea being that the data need not be revealed until the actual computation is required on that data. In this manner, the maximum amount of privacy is maintained until such time as actual calculations on the data are performed.

In one exemplary implementation, CryptDB creates up to four separate onion layers per entry. The final layer comprises randomized encryption (or some other encryption providing comparable security) with an encryption mechanism and/or key unique to this entry and layer, which protects the user's privacy the most since entries that correspond to the same plain values cannot be linked to any other data stored elsewhere. By peeling off this final layer (by the user giving its key for this final layer to the database server), the underlying encryption scheme is revealed. For example, the encryption scheme may comprise a deterministic encryption scheme that allows the server to perform equality testing (in CryptDB this layer can be peeled off as well to reveal a "join" encryption layer that allows the performance of join operations).

CryptDB provides a universal database interface that adapts to the best possible privacy posture that can be achieved given the user's database usage. Once the user reveals keys to the database server to allow the database server to provide the functionality the user has asked for, the corresponding privacy is leaked. In one exemplary embodiment, once a key is used to decrypt a layer, the result is cached and computed on. The cache should get cleared as soon as the computation is complete. The original/updated DB entries maintain their full onion structure. Thus, the attack surface is minimized to the time of exposure of lower encryption layers in the database cache, assuming that the server itself remains as a trusted entity.

Generally, as discussed further below in conjunction with FIG. 3, aspects of the present invention employ a secure computing container (SCC) in conjunction with a key manager (KM). If an access manager (AM) grants a user access to certain derived results, then the access manager directs the key manager to release the appropriate data protection keys together with the corresponding computing restrictions to the secure computing container. As used herein, the term "derived results" shall mean the results of a database query over the protected data. For example, the derived results could be specifically extracted rows and columns, as selected by the query, or aggregated results also as specified by the query, or any other result of a query. The secure computing container retrieves the appropriate database or file system (FS) entries and computes the desired result on behalf of the user. The user receives the result encrypted under its user key.

FIG. 1 illustrates an electronic environment 10 in which aspects of the present invention can be employed. Electronic environment 10 includes communications medium 12, authentication requestor 18 and adaptive authentication system 13. While the present invention is illustrated in the context of an adaptive authentication system, the present invention can be employed using other authentication techniques, as would be apparent to a person of ordinary skill in the art.

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, a baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved technique and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
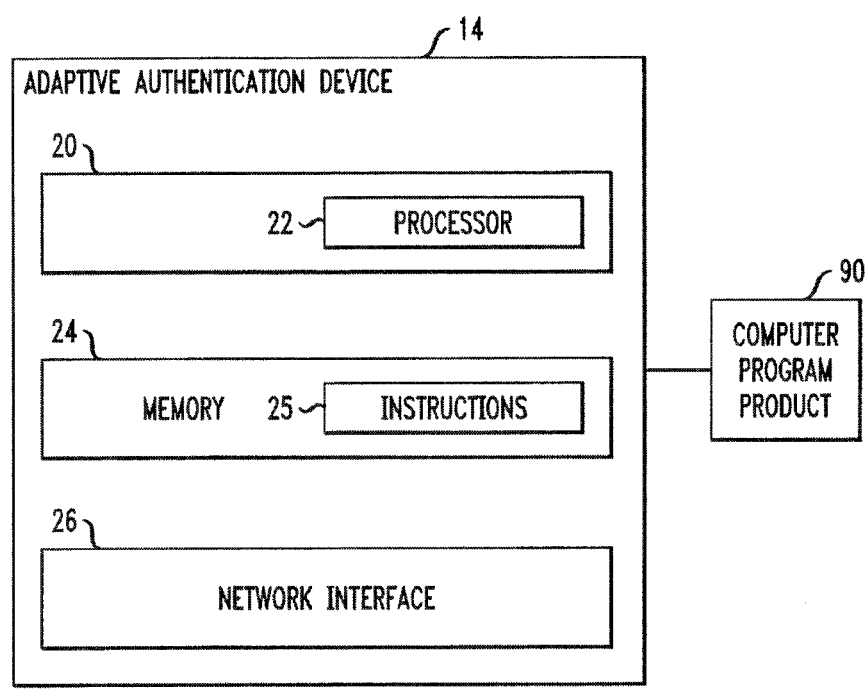
FIG. 2 is a schematic diagram illustrating an adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Processor 22 then combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication," (now U.S. Pat. No. 8,621,586), and/or U.S. patent application Ser. No. 12/751,057, filed Mar. 31, 2010, entitled "Techniques for Authenticating Users of Massive Multiplayer Online Role Playing Games Using Adaptive Authentication," (now U.S. Pat. No. 8,370,389), each incorporated by reference herein.

Granting Access to Derivative Results Based on Intended Use

As indicated above, aspects of the present invention employ a secure computing container (SCC) in conjunction with a key manager (KM). If an access manager (AM) grants a user access to certain derived results for a particular usage, then the access manager directs the key manager to release the appropriate data protection keys together with the corresponding computing restrictions to the secure computing container. The secure computing container retrieves the appropriate database or file system (FS) entries and computes the desired result on behalf of the user. The user receives the result encrypted under its user key. The data usage may have an associated risk score based on the layer number of the onion (i.e., how far into the onion is required for the computation) and a classification of the data entry (column), for example, based on a business value.

Figure 3:
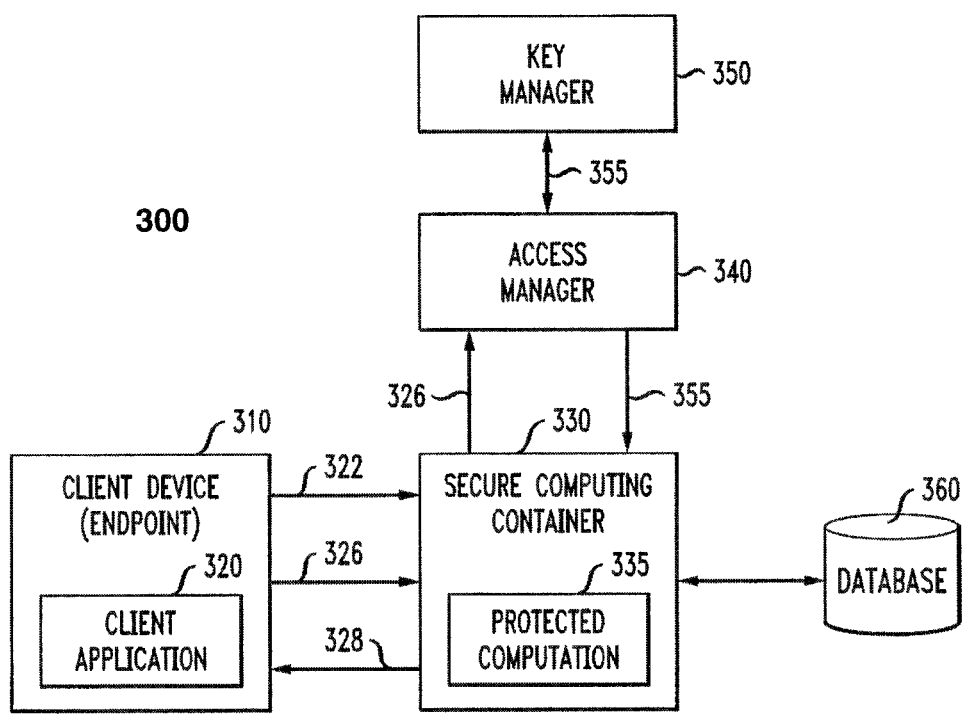
FIG. 3 illustrates an exemplary network environment that incorporates aspects of the present invention to mediate access to derivates of sensitive data.

FIG. 3 illustrates an exemplary network environment 300 that incorporates aspects of the present invention to mediate access to derivates of sensitive data. As shown in FIG. 3, the exemplary network environment 300 comprises a client device 310 running a client application 320. The client application 320 provides requests 322 and identity information 326 to a secure computing container 330. Generally, the secure computing container 330 is a trusted compute facility that can make calculations on the data and return the result, without revealing the inputs, to the caller. In this manner, the privacy of the data itself is maintained, even though the ability to fully analyze that data is maintained. In one embodiment, the presence or absence of a secure computing container in the system 300 can impact the risk score associated with the request 322.

The requests 322 comprise requests for secure data from a database 360 for a particular usage. The identity information 326 comprises information about the user, the client device 310 and the usage of the requested data. The client application 320 receives results 328 from the secure computing container 330. In one embodiment, the amount of privacy revealed by the results 328 can impact the risk score assigned to a request 322. In other multi-tenant embodiments, a tenant identifier can be a component of the risk score assigned to a request 322.

The database 360 stores data that is protected using onion-layered encoding. In one exemplary implementation, for each field in the database 360, the database 360 maintains subfields for each layer of the onion.

The secure computing container 330 includes a protected computation block 335 to process queries and other requests. The secure computing container 330 provides the identity information 326 to an access manager 340. As discussed further below, the access manager 340 evaluates the identity information 326 and if the identity information 326 is validated, the access manager 340 grants a user access to certain derived results. The access manager 340 may be embodied, for example, as an adaptive authentication server, as modified herein to provide the features and functions of the present invention. Generally, the access manager 340 measures the trustworthiness of a compute request. For example, the access manager 340 might ask the client device 310 for several authentication factors, measuring various aspects of the client device including software running thereon, previous browsing and other network access history, various nearby devices including their locations, as well as other factors. The measured factors of the client device are compared with prior results obtained from the same user as well as other users who might access the system. The access manager 340 employs an engine to decide whether access should be granted. The access manager 340 considers the compute request itself and the amount of privacy leakage involved. In this sense, the access manager 340 supplies adaptive authentication based on data (user identity, state of the end-point device and compute request are used to decide whether to grant access or not).

In one exemplary embodiment, the overall risk (e.g., privacy leakage) can be expressed as follows:

Overall Risk=User Risk×Transaction Risk;

where User Risk is calculated by behavior and device fingerprint as compared to historical patterns, as described above; and Transaction Risk is calculated by the sensitivity of the specific column and by the level of the onion layer revealed.

If access is grate granted, the access manager 340 directs a key manager 350 to release the appropriate data protection keys 355 together with the corresponding computing restrictions to the secure computing container 330. The data protection keys 355 optionally correspond to onion layers as in CryptDB. In one embodiment, the data protection keys 355 are a function of a key root, a column number of the database 360 and a layer number associated with the intended use.

In a further variation, the data protection keys 355 represent keys with which subsets of data are encrypted. In this manner, the secure computing container 330 can retrieve a subset of data by using a single decryption key. It is noted that not all the data within a subset is generally needed for a single computation. In order to minimize the attack surface, encrypted subsets preferably fit the data needed for the computation. This can be achieved by using appropriate broadcast encryption techniques.

The access manager 340 thus obtains the keys 355 from the key manager 350 and securely provides the keys 355 to the secure computing container 330. In addition, the secure computing container 330 obtains the appropriate protected data entries from the database 360 that is necessary to process the request 322. The secure computing container 330 uses the keys 355 to decrypt the protected data 365 and then processes the request 322 to compute the desired result 328 on behalf of the user. The secure computing container 330 provides the result 328 to the client application 320. In one embodiment, the user receives the result 328 encrypted under its user key. Broadcast encryption techniques of the result 328 can optionally be employed if the result needs to be released to (large sets of) multiple users.

In one embodiment, a user specific view is optionally stored (e.g., using a drop box approach) in a separate file system (not shown in FIG. 3) for fast future retrieval (this functions as a user specific cache/directory). This allows a user to directly retrieve (if the access manager 340 grants access) everything the user has already received before.

It is to be appreciated that a given embodiment of the disclosed system may include multiple instances of client device 310, secure computing container 330, access manager 340, key manager 350 and/or database 360, and possibly other system components, although only single instances of such components are shown in the simplified system diagram of FIG. 3 for clarity of illustration.

The client device 310 may represent a portable device, such as a mobile telephone, personal digital assistant (PDA), wireless email device, game console, etc. The client device 310 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The client device 310 may also be referred to herein as simply a "user" or "client." The terms "user" and "client" should be understood to encompass, by way of example and without limitation, a user device, a person utilizing or otherwise associated with the device 310, an application or process executing on the device 310 or a combination of the foregoing. An operation described herein as being performed by a user may therefore, for example, be performed by a user device, a person utilizing or otherwise associated with the device, an application or process executing on the device, or by a combination of the person, the device and the application. Similarly, a password or other authentication information described as being associated with a user may, for example, be associated with a client device 310, a person utilizing or otherwise associated with the device, the client application 320 or a combination of the person, the device and the application.

The access manager 340 and key manager 350 are typically associated with a third party entity, such as an authentication authority, that processes authentication requests on behalf of web servers and other resources, and verifies the authentication information that is presented by a client device 310.

In further variations, the database 360 may be replaced by another storage resource, such as, for example, an access-controlled application, web site or hardware device, or any such web-service that can store and retrieve information on behalf of the user.

The secure computing container 330 can be based on cryptography alone as in CryptDB or can be based on trust derived from one or more hardware security modules (HSMs). Distributed HSMs can optionally be employed such that secure agent-based computation is possible (e.g., as in the map-reduce paradigm). Each HSM is used to implement a separate secure computing container 330 and different secure computing containers 330 may communicate with one another by transferring (encrypted) agents that encode the computation that has been done, the intermediate result, and the computation that remains to be done. Such an approach may be employed, for example, for computation on a large data set that is distributed over several locations/storage servers. An HSM can also optionally be used to manage an authenticated (search) tree to check integrity, freshness and produce proofs of non-existence of data.

As indicated above, aspects of the present invention grant access to data based on the manner in which the data will be used. As discussed hereinafter, the access manager 340 evaluates the risk associated with the user using multiple factors, including the risk of the client device 310 and the intended use of the data. The user may be impersonated by malicious software with which the client device (end-point) 310 is infected. In this manner, the trust is measured by the access manager 340 using multiple factors and may reflect attributes that are specific to a user, specific to a request, and/or to the state of the overall processing environment. Depending on the trust level and the required utility, a policy based engine or risk based engine decides whether the secure computing container 330 should compute and release the desired result 328 with as consequence the corresponding privacy leakage.

It is noted that if the secure computing container 330 operates on a database 360, then the secure computing container 330 performs concurrency control, which coordinates the actions of processes that operate in parallel, access shared data, and therefore potentially interfere with each other. Although two transactions may be correct in themselves, interleaving of operations may produce an incorrect result.

The enterprise that owns the database 360 or another protected storage system is in control of which trust, privacy and utility trade-offs it allows as its security posture. Through feedback from the users or other external factors, the enterprise may adapt its security posture. The balance among the trust, privacy and utility dimensions corresponds to the risk (defined by its access manager policy) an enterprise is willing to take. This balance is dynamic and changes over time: the enterprise may use feedback mechanisms together with a meta-engine to adapt its security posture over time.

In one embodiment of the invention, feedback to the meta-engine can depend on how the behavior of released derivatives of data is measured, how the released data derivatives are used (e.g., equivalence questions, clear text and order preserving), where the released data derivatives are stored, where the released data derivatives are accessed, the identity of the entity requesting the data derivatives and the access patterns to the data. The meta-engine may set access policies according to, for example, the behavior of subjects using the data, behavior of what aspects of the data is used, the content, time sensitivity and the number of users.

FIG. 4 illustrates pseudo code for an exemplary database creation process 400. As shown in FIG. 4, for each column, and for each onion layer for various computations on the data (see, e.g., CryptDB), the exemplary database creation process 400 picks an appropriate encryption algorithm during step 410, and generates a unique key. During step 420, if parallel onion schemes are desired (to provide finer grained control), then the exemplary database creation process 400 ensures that the appropriate new columns, corresponding to the original column, are created.

FIG. 5 illustrates pseudo code for an exemplary data insertion process 500. As shown in FIG. 5, when data is placed into a given row, a client request 322 requests the Access Manager 340/Key Manager 350 to grant indirect access to the keys during step 510. The Access Manager 340/Key Manager 350 then checks the Access Controls rules and performs authentication and risk checks during step 520.

The Access Manager 340/Key Manager 350 releases the appropriate keys to the secure computing container 330 during step 530. The client 310 provides data for the row to the secure computing container 330 during step 540.

For each column, the data is inserted during step 550 by encrypting the data with each layer as chosen above, and inserting the resulting data into the given column from the database 360 (FIG. 3).

If parallel onion schemes are desired, the new data is nest-encrypted during step 560 and inserted in the new column as described in the database creation process 400. During step 570, the secure computing container 330 deletes key material as indicated by the key-hygiene policy of the overall system 300.

FIG. 6 illustrates pseudo code for an exemplary data computation process 600. As shown in FIG. 6, during step 610, the Client 310 requests the Access Manager 340/Key Manager 350 to grant indirect access to the keys. The Access Manager 340/Key Manager 350 then checks the Access Controls rules and performs Authentication and Risk Checks during step 620.

The Access Manager 340/Key Manager 350 releases the appropriate keys to SCC 330 during step 630. During step 640, the Client 310 requests the SCC 330 to perform calculations. The SCC 330 retrieves data from the Database 360 during step 650.

The SCC 330 opens onion layers using the keys provided by the Access Manager 340/Key Manager 350 during step 660 and the SCC 330 computes the results 328.

During step 670, the SCC 330 returns the results 328 to the Client 310. Finally, the SCC 330 deletes the key material during step 680, as indicated by the key-hygiene policy of the overall system.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14 which identifies particular events for alerting within event notification management system. Some embodiments are directed to adaptive authentication device 14. Some embodiments are directed to a system which processes an authentication request from an authentication requestor. Some embodiments are directed to a method of processing an authentication request from an authentication requestor. Also, some embodiments are directed to a computer program product which enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved authentication of users. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in the figures and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for processing a data request from a client for sensitive data, the data request comprising a client identifier and an indication of the intended use of the sensitive data by the client, the method comprising the steps of:
   receiving the data request from the client;
   providing the client identifier and the indicated use to an access manager, wherein the access manager assesses a risk of providing access to the sensitive data for said indicated use;
   if the access manager grants access for the indicated use, receiving one or more keys with corresponding computing restrictions;
   computing a result using a hardware protected computation block; and
   providing said result to said client, wherein said provided result comprises a derivative of said sensitive data, wherein at least one of said steps is performed by at least one hardware device.

2. The method of claim 1, further comprising the step of retrieving a layer of one or more encrypted database entries identified by said data request, wherein said layer is associated with said indicated use.

3. The method of claim 1, wherein said access manager grants said access for the indicated use based on a risk score.

4. The method of claim 3, wherein said risk score is based on information revealed by said layer.

5. The method of claim 3, wherein said risk score is based on a classification of the one or more encrypted database entries.

6. The method of claim 3, wherein said risk score is based on an amount of information revealed by the result.

7. The method of claim 3, wherein said risk score is based on a tenant identifier of the client.

8. The method of claim 3, wherein said risk score is based on a presence of the secure computing container.

9. The method of claim 3, wherein said risk score comprises an overall risk, wherein said overall risk is a product of a User Risk for a user associated with said data request and a Transaction Risk for a transaction associated with said data request.

10. The method of claim 9, wherein said User Risk compares a behavior and device fingerprint for said data request to historical patterns.

11. The method of claim 9, wherein said Transaction Risk is calculated based on a sensitivity of the one or more encrypted database entries and by an amount of information revealed by said data request.

12. The method of claim 1, wherein the result is provided to said client encrypted using an encryption key of said client.

13. The method of claim 1, wherein said access manager performs one or more additional risk-based authentication operations.

14. A non-transitory machine-readable recordable storage medium for processing a data request from a client, wherein one or more software programs when executed by one or more processing devices implement the steps of the method of claim 1.

15. A system for processing a data request from a client for sensitive data, the data request comprising a client identifier and an indication of the intended use of the sensitive data by the client, the system comprising:
   a memory; and
   at least one hardware device, coupled to the memory, operative to implement the following steps:
   receive the data request from the client;
   provide the client identifier and the indicated use to an access manager, wherein the access manager assesses a risk of providing access to the sensitive data for said indicated use;
   if the access manager grants access for the indicated use, receive one or more keys with corresponding computing restrictions;
   compute a result using a hardware protected computation block; and
   provide said result to said client, wherein said provided result comprises a derivative of said sensitive data.

16. The system of claim 15, wherein said at least one hardware device is further configured to retrieve a layer of one or more encrypted database entries identified by said data request, wherein said layer is associated with said indicated use.

17. The system of claim 15, wherein said access manager grants said access for the indicated use based on a risk score.

18. The system of claim 17, wherein said risk score is based on information revealed by said layer.

19. The system of claim 17, wherein said risk score is based on a classification of the one or more encrypted database entries.

20. The system of claim 17, wherein said risk score is based on an amount of information revealed by the result.

21. The system of claim 17, wherein said risk score is based on a tenant identifier of the client.

22. The system of claim 17, wherein said risk score is based on a presence of the secure computing container.

23. The system of claim 17, wherein said risk score comprises an overall risk, wherein said overall risk is a product of a User Risk for a user associated with said data request and a Transaction Risk for a transaction associated with said data request.

24. The system of claim 15, wherein the result is provided to said client encrypted using an encryption key of said client.

25. The system of claim 15, wherein said access manager performs one or more additional risk-based authentication operations.

* * * * *